United States Patent
Wazumi

[15] 3,668,985
[45] June 13, 1972

[54] CAMERA FLASH INDICATING SYSTEM
[72] Inventor: Seiichi Wazumi, Toyokawa, Japan
[73] Assignee: Minolta Camera Company Limited, Osaka, Japan
[22] Filed: Dec. 12, 1968
[21] Appl. No.: 783,241

[52] U.S. Cl.................................................95/10 C, 95/11 V
[51] Int. Cl..........................................G03b 17/20, G01j 1/52
[58] Field of Search..........................95/10 C, 11, 11 L, 11 V

[56] References Cited

UNITED STATES PATENTS

| | | | |
|---|---|---|---|
| 3,357,328 | 12/1967 | Kinder et al. | 95/11 |
| 3,393,620 | 7/1968 | Reiche et al. | 95/11 |
| 3,406,620 | 10/1968 | Hochreiter et al. | 95/11 X |
| 3,416,422 | 12/1968 | Dietrich et al. | 95/11 |
| 3,424,071 | 1/1969 | Schwahn | 95/11.5 |

Primary Examiner—Samuel S. Matthews
Assistant Examiner—Fred L. Braun
Attorney—Stanley Wolder

[57] ABSTRACT

A camera flash indicating signal system includes a camera view finder and a mirror located in the finder for reflecting light from a transverse path to the finder eyepiece. A convex lens, indicator element and electric lamp are spaced along the transverse path. The indicator element is located at the conjugate position of the eyepiece through the lens and the lamp is visible through a camera front window. The lamp is connected to a battery through a series connected first switch and a normally open second switch coupled to the camera shutter button for closing the second switch before shutter release. The first switch is either actuated selectively, or by a photocell controlled mechanism.

7 Claims, 5 Drawing Figures

PATENTED JUN 13 1972 3,668,985

CAMERA FLASH INDICATING SYSTEM

BACKGROUND OF THE INVENTION

The present invention relates generally to improvements in cameras provided with flash triggering networks and it relates particularly to an improved system in a camera which provides a plural indication of the requirement or setting of the camera for flash photography.

In photographing live subjects in which the film exposure may be effected either solely under ambient light conditions or with a photoflash it is highly desirable that the operator as well as the live subject be aware of the requirement or setting for photoflash exposure. Many cameras are available in which information is provided through the view finder relating to such parameters and conditions as distance of the object, diaphragm aperture, shutter speed, etc. However, this information is available only to the operator of the camera and no indication relative to such information is available to the subject. Moreover, it is highly desirable that information relating to the requirement and camera setting for flash photography be provided not only to the camera operator but to the subject as well and cameras have heretofore been lacking in any mechanism or system for furnishing such information.

SUMMARY OF THE INVENTION

It is a principal object of the present invention to provide an improved camera having a photoflash triggering system.

Another object of the present invention is to provide an improved photoflash camera having means for presenting an indication of the requirement or camera setting for photoflash photography.

Still another object of the present invention is to provide an improved photoflash camera which provides a visual indication, both to the operator through the camera view finder and to the subject, of the requirement or camera setting for photoflash photography.

A further object of the present invention is to provide an improved camera system of the above nature characterized by its reliability, simplicity, compactness, convenience and ease of use.

The above and other objects of the present invention will become apparent from a reading of the following description taken in conjunction with the accompanying drawing which illustrates a preferred embodiment thereof.

In a sense the present invention contemplates the provision of a camera flash indicating mechanism comprising a camera including a view finder and a shutter release button, an electrically energized visual indicating device mounted in said camera and viewable through said finder and from the front of said camera, a current source, and first and second switches connected in series with said indicating device and said current source, said second switch being normally in an open position and being coupled to said shutter release button and actuatable to a closed position by depressing thereof.

According to a preferred form of the present system there is provided a housing in the camera including a pair of longitudinally aligned front and rear openings having concave and convex lenses located therein defining a viewfinder and a laterally offset front window opening. An electric lamp registers with the window opening. A 45° mirror is disposed along the bottom of the view finder and a convex lens is positioned between the mirror and lamp and an indicator element is positioned between the lamp and convex lens at the conjugate position of the viewfinder eyepiece as reflected by the mirror through the convex lens. A pair of first and second series connected switches are connected between a battery and the lamp. The second switch is normally open and is coupled to the shutter so as to be closed when the button is between its shutter release position and its retracted position. The first switch is either manually operable or is actuated by a photocell responsive mechanism to close under inadaquate ambient light conditions.

DESCRIPTION OF THE PREFERRED EMBODIMENT

Figure 1:
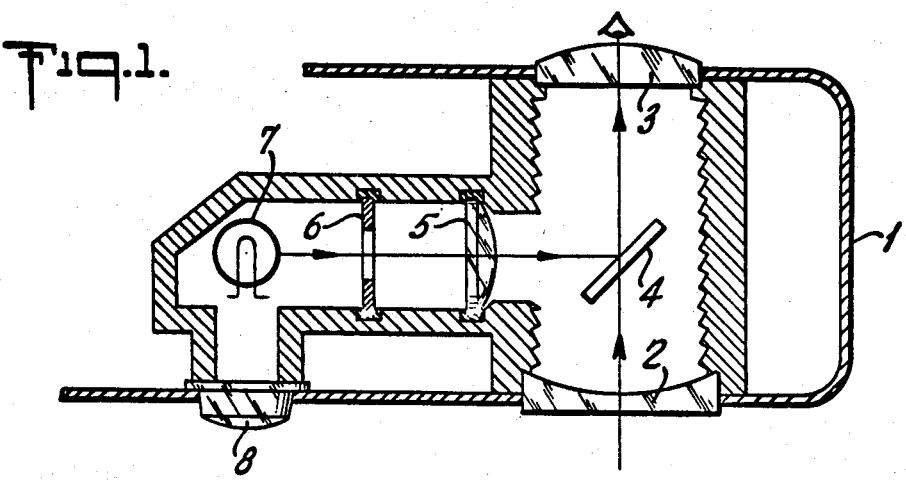
FIG. 1 is a horizontal sectional view of the optical section of an indicating system embodying the present invention.
Figure 2:
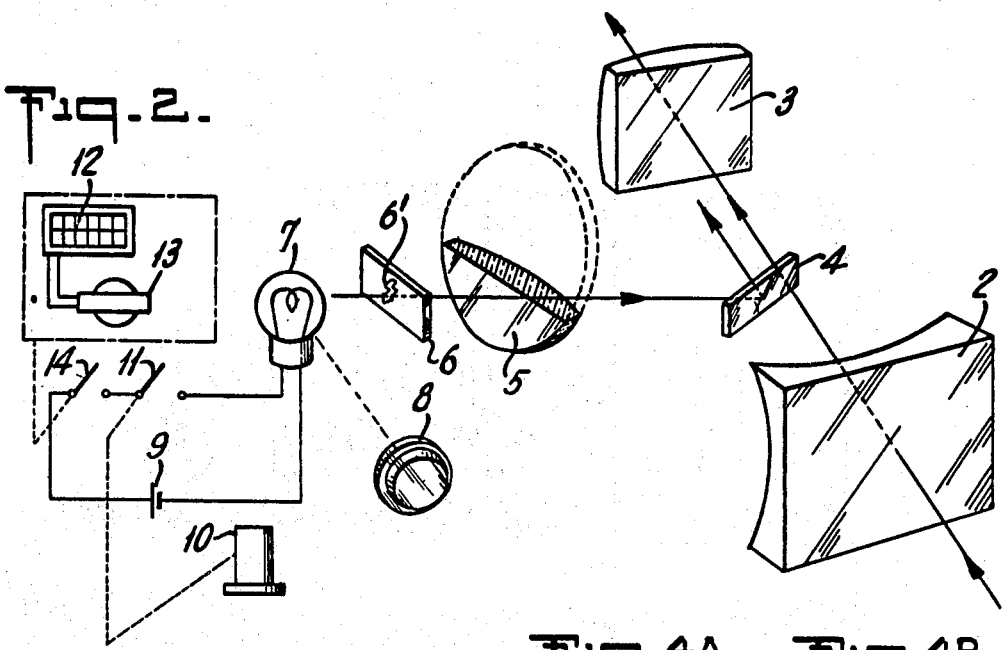
FIG. 2 is a schematic and perspective diagrammatic view of the improved system.
Figure 3:
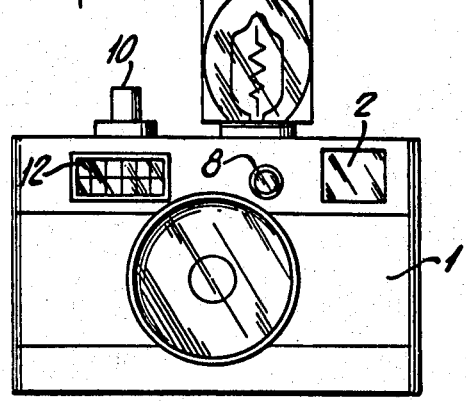
FIG. 3 is a front view of an improved camera employing said system.

Referring now to the drawing which illustrates a preferred embodiment of the present invention, the reference numeral 1 generally designates a camera provided with the improved indicating system. Mounted in the camera 1 is a housing including a transversely extending tubular view finder housing first section open at its front and rear ends and a second section extending longitudinally from the first section and terminating in a forwardly projecting open ended leg section. A concave lens 2 is mounted in the housing section front opening and a convex eyepiece lens 3 is mounted in the housing rear opening in alignment with lens 2, lenses 2 and 3 forming a reverse Galileo type view finder.

A narrow mirror 4 is located between lenses 2 and 3 at the bottom of the view finder and at 45° to its optical axis with its reflecting face directed toward eyepiece lens 3 and transversely along the housing second section, it being noted that a semimirror may be substituted for mirror 4. Located in opposite ends of the housing longitudinal section are a convex lens 5 proximate mirror 4 and an electric lamp 7 in registry with the housing open ended by section. The lens 5 which is at the level of mirror 4 is advantageously a segment of a circular lens with the cord edge uppermost and horizontal.

Positioned between lamp 7 and lens 5 at the level of mirror 4 is a transverse vertical transparent plate 6 carrying any desirable indicia 6' of any desirable representation, such as a flash, as indicated. The plate 6 is located at the bright conjugate position from eyepiece 3 to the convex lens 5 by way of mirror 4. An indicator lens or window member 8 which may be clear or colored is mounted on the front face of camera 1 in alignment with lamp 7 through the front opening in the housing transverse leg section.

The lamp 7 is connected through a pair of series connected switches 11 and 14 across a current source battery 9. The switch 11 is normally open and is mechanically coupled to the shutter release button 10 of camera 1 in any suitable manner so as to be closed when the release button 10 is depressed below its fully retracted position but before it reaches its shutter release position, preferable intermediate its retracted and shutter release positions.

The switch 14 is either manually selectively controlled to its open or closed position or it is automatically controlled in response to the ambient light to open when the ambient light exceeds a predetermined value and to close when such light is less than this predetermined light value wherein flash photography is desirable. To automatically control switch 14 in response to ambient light conditions there is provided a photocell 12 such as, for example, a selenium or silicon photocell, which is connected across a sensitive current meter 13 the movable armature of which is coupled to and controls the opening and closing of switch 14 when the current in the armature is above and below a predetermined value respectively.

Figure 4A:
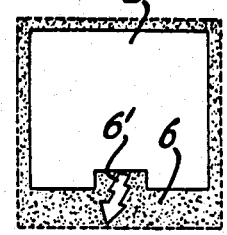
FIGS. 4A and 4B are different views which may be observed in the view finder indicating flash photography.
Figure 4B:
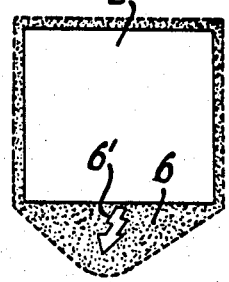

Considering now the operation of the improved camera 1 described above the operator views the subject to be photographed through the viewfinder eyepiece 3. He partially depresses shutter release button 10 a position to close switch 11 but not release the shutter and if switch 14 is closed, either manually or automatically in response to the light incident on photocell 12, the lamp energizing network across battery 9 is closed thus energizing and lighting lamp 7. The operator thus observes the illuminated plate 6 and indication 6' at the lower border of the viewed subject, as illustrated in FIGS. 4A or 4B, the plate 6 being in the viewing plane of the optical system including lenses 3 and 5 and mirror 4. Concurrently, the light from energized lamp 7 projects through window 8 in the camera front providing the subject with a visual indication of the requirement or setting for flash photography so that he may act accordingly. However, when the switch 14 is open indicating no need or setting for flash photography the lamp 7 is not energized and no indication is given. Shortly after closing the switch 11 the operator may fully depress button 10 to release the shutter.

While there has been described and illustrated a preferred embodiment of the present invention it is apparent that munerous alterations, additions and omissions may be made without departing from the spirit thereof. For example, while mirror 4 and lens 5 have been illustrated as separate elements, they may be advantageously integrally formed.

I claim:

1. A camera flash indicating mechanism comprising a camera including a view finder and shutter release button, an electric lamp mounted in said camera and simultaneously viewable through said finder and on the front of said camera, a battery current source, first and second switches connected in series with said electric lamp directly across said current source, said second switch being normally in an open position and being coupled to said shutter release button and actuatable to a closed position by said button before shutter release and electrically motivated control means responsive to incident light for opening and closing said first switch when said light is above and below a predetermined value respectively.

2. The mechanism of claim 1, said control means including a photocell and means responsive to the light incident on said photocell for opening and closing said first switch when said incident light exceeds and drops below said predetermined value respectively.

3. The mechanism of claim 1 wherein said view finder comprises a rear eyepiece and a front objective lens, said electric lamp being transversely offset from the axis of said eyepiece and objective lens, and a mirror positioned between said eyepiece and objective lens for reflecting light from said lamp to said eyepiece.

4. The mechanism of claim 3 including a convex lens positioned along the axis of said eyepiece as reflected by said mirror and an indicator element located at the conjugate position of the eyepiece through said convex lens.

5. The mechanism of claim 4 wherein said mirror is offset from the optical axis of said view finder.

6. The mechanism of claim 4 including a first housing section having front and rear openings registering with said eyepiece and objective lens and a side opening registering with said mirror and a second housing extending laterally from and communicating with said side opening, said lamp, indicator element and convex lens being disposed in said second housing, said second housing having a front window registering with said lamp.

7. The mechanism of claim 1 wherein said control means comprises a current meter having a current responsive movable armature coupled to and controlling the opening and closing of said first switch and a photocell electrically coupled to the input of said meter.

* * * * *